US012595333B2

(12) United States Patent
Chen et al.

(10) Patent No.: US 12,595,333 B2
(45) Date of Patent: Apr. 7, 2026

(54) CURABLE ADHESIVE, BONDING FILM, AND METHOD OF BONDING THE SAME

(71) Applicant: 3M INNOVATIVE PROPERTIES COMPANY, St. Paul, MN (US)

(72) Inventors: Lianzhou Chen, Woodbury, MN (US); Kristen J. Hansen, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1049 days.

(21) Appl. No.: 17/287,435

(22) PCT Filed: Oct. 24, 2019

(86) PCT No.: PCT/IB2019/059142
§ 371 (c)(1),
(2) Date: Apr. 21, 2021

(87) PCT Pub. No.: WO2020/089747
PCT Pub. Date: May 7, 2020

(65) Prior Publication Data

US 2021/0355268 A1 Nov. 18, 2021

Related U.S. Application Data

(60) Provisional application No. 62/753,549, filed on Oct. 31, 2018.

(51) Int. Cl.

| | |
|---|---|
| ***C08G 59/24*** | (2006.01) |
| ***C08G 59/06*** | (2006.01) |
| ***C08G 59/22*** | (2006.01) |
| ***C08G 59/26*** | (2006.01) |
| ***C08G 59/32*** | (2006.01) |
| ***C08G 59/38*** | (2006.01) |
| ***C08G 59/40*** | (2006.01) |
| ***C08K 3/08*** | (2006.01) |
| ***C08L 63/00*** | (2006.01) |
| ***C09J 7/38*** | (2018.01) |

(52) U.S. Cl.
CPC ........... *C08G 59/245* (2013.01); *C08G 59/26* (2013.01); *C08G 59/3227* (2013.01); *C08G 59/38* (2013.01); *C08G 59/4021* (2013.01); *C08K 3/08* (2013.01); *C08L 63/00* (2013.01); *C09J 7/38* (2018.01); *C08G 2170/40* (2013.01); *C08K 2003/0812* (2013.01); *C08L 2205/025* (2013.01); *C08L 2205/035* (2013.01); *C08L 2207/04* (2013.01); *C08L 2207/53* (2013.01); *C09J 2301/302* (2020.08)

(58) Field of Classification Search
None
See application file for complete search history.

(56) References Cited

U.S. PATENT DOCUMENTS

| | | | | |
|---|---|---|---|---|
| 3,960,795 | A | 6/1976 | Dowbenko | |
| 4,680,341 | A | 7/1987 | Newman-Evans | |
| 4,948,449 | A | 8/1990 | Tarbutton | |
| 6,482,885 | B1 | 11/2002 | Müller | |
| 6,624,213 | B2 | 9/2003 | George | |
| 8,518,208 | B2 | 8/2013 | Kohli | |
| 9,951,217 | B2 | 4/2018 | Peters | |
| 2001/0029279 | A1 | 10/2001 | Müller | |
| 2005/0027024 | A1 | 2/2005 | Zhang | |
| 2011/0048637 | A1 * | 3/2011 | Kohli | C08L 81/00 524/437 |

FOREIGN PATENT DOCUMENTS

| | | | | |
|---|---|---|---|---|
| CN | 104194662 | | | 12/2014 |
| JP | 6-240069 | | | 8/1994 |
| JP | 2008179739 | A | * | 8/2008 |
| JP | 5273762 | | | 8/2013 |
| JP | 2015199931 | | | 11/2015 |
| JP | 2015199931 | A | * | 11/2015 |
| WO | WO 2011-142466 | | | 11/2011 |
| WO | WO 2013-183736 | | | 12/2013 |
| WO | WO 2014-175346 | | | 10/2014 |
| WO | WO 2020-003122 | | | 1/2020 |

OTHER PUBLICATIONS

International Search Report for PCT International Application No. PCT/IB2019/059142, mailed on Jan. 22, 2020, 4 pages.
Hexion Safety Data Sheet for E828RS / A100 500 lb Closed Head, Version 19.0, Feb. 3, 2015, pp. 1-13.
Obaid et al., "Enhancement of adhesion between copper and vinyl ester in glass fiber-vinyl ester composites", Composite Interfaces, vol. 14, No. 2 (2007) pp. 99-116.
Technical Data Bulletin from Hexion for Epon 828, re-issued Sep. 2005, pp. 1-8.

* cited by examiner

*Primary Examiner* — Ha S Nguyen
(74) *Attorney, Agent, or Firm* — Carlos M. Téllez Rodríguez; 3M Innovative Properties Company

(57) ABSTRACT

A curable composition comprises: 1 to 65 percent by weight of polyepoxide comprising an addition reaction product of phenolphthalein and bisphenol A diglycidyl ether; 5 to 50 percent by weight of liquid polyepoxide; and an effective amount of curative for curing the curable composition. A curable adhesive film comprising the curable composition, and method of bonding are also disclosed.

15 Claims, No Drawings

CURABLE ADHESIVE, BONDING FILM, AND METHOD OF BONDING THE SAME

TECHNICAL FIELD

The present disclosure broadly relates to epoxy-based adhesives and bonding films, and methods of their use.

BACKGROUND

Epoxy-resin-based adhesives are often used as bonding adhesives for applications where high bond strength and durability are desired. In order to facilitate handling and/or ease of use, the adhesive is often formulated as a curable adhesive film, also known as a "bonding film" in the art. Bonding films with sufficiently high adhesion and durability after cure are typically known as structural bonding films.

Conventional bonding films either use a bisphenol A-extended solid epoxy compound or multifunctional epoxy solid, which together with liquid epoxies and epoxy curatives, provide desired handling properties to the bonding film. However, because of the presence of the bisphenol A (BPA) moiety, the glass transition temperature ($T_g$) of the cured composition decreases with increasing BPA moiety content leading to reduced adhesive bond strength at elevated temperatures. Overabundant multifunctional solid epoxy in a composition will increase the crosslink density of the thermoset system, which impacts adhesive peel performance.

SUMMARY

It would be desirable to have new epoxy-based adhesives that exhibit good adhesion with desirable shear and peel performance at elevated temperatures. Advantageously, the curable compositions of the present disclosure achieve such properties by replacing at least some of the bisphenol A-based epoxy compounds with phenolphthalein-based epoxy compounds. The resulting curable compositions, upon curing, generally have increased $T_g$ values relative to their bisphenol A-based counterparts.

In one aspect, the present disclosure provides a curable composition comprising, based on the total weight of the curable composition:

a) 1 to 65 percent by weight of polyepoxide comprising an addition reaction product of phenolphthalein and bisphenol A diglycidyl ether; and b) 5 to 50 percent by weight of liquid polyepoxide, wherein the liquid polyepoxide is exclusive of component a); and c) an effective amount of curative for curing the curable composition.

In another aspect, the present disclosure provides a curable adhesive film comprising a curable composition according to the present disclosure.

In another aspect, the present disclosure provides a method of bonding a curable adhesive film to a substrate, the method comprising intimately contacting a curable adhesive film according to the present disclosure with the substrate, and at least partially curing the curable adhesive film.

As used herein, the terms "liquid" and "solid" refer to physical states of matter at 20° C.; and the term "polyepoxide" refers to a compound having at least two monovalent epoxy groups shown below:

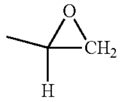

Bisphenol A has the structural formula shown below:

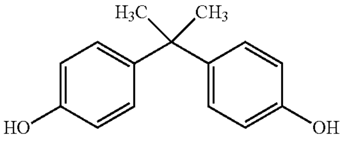 [SMILES: CC(C)(c1ccc(O)cc1)c1ccc(O)cc1]

Phenolphthalein has the structural formula shown below:

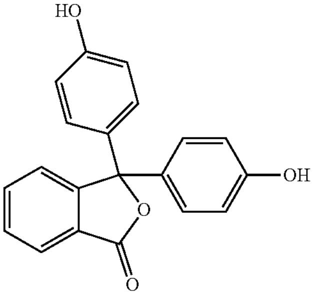 [SMILES: O=C1OC(c2ccc(O)cc2)(c2ccc(O)cc2)c2ccccc21]

Features and advantages of the present disclosure will be further understood upon consideration of the detailed description as well as the appended claims.

DETAILED DESCRIPTION

The curable composition comprises, based on the total weight of the curable composition:

1 to 65 percent by weight, preferably 5 to 65 percent by weight, more preferably 20 to 55 percent by weight, and more preferably 25 to 45 percent by weight of liquid polyepoxide;

5 to 50 percent by weight, preferably 10 to 40 percent by weight, and more preferably 10 to 30 percent of polyepoxide comprising an addition reaction product of phenolphthalein and bisphenol A diglycidyl ether; and an effective amount, typically 0.001 to 50 percent by weight, preferably 0.1 to 45 percent by weight, and more preferably 5 to 40 percent by weight of curative (which may comprise one or more curatives) for curing the curable composition.

The above-listed components of the curable composition may total less than 100 percent of the total weight of the curable composition, with the difference being composed of other optional components. Exemplary optional components include thixotropes, fillers, thermoplastic polymers, tougheners (e.g., core-shell rubber particles), monofunctional epoxides, colorants, light stabilizers, antioxidants, surfactants, plasticizers/flexibilizers, and antimicrobial agents.

Liquid polyepoxides may comprise one or more liquid polyepoxides. They may have two, three, four, five, six, seven eight, or more monovalent epoxy groups. Examples include: 1,4-butanediol diglycidyl ether; neopentyl glycol diglycidyl ether; bisphenol A diglycidyl ether; 1,4-cyclohexanedimethanol diglycidyl ether; polyoxypropylene glycol diglycidyl ether; 1,3-propanediol diglycidyl ether; ethylene glycol diglycidyl ether; trimethylolpropane triglycidyl ether; and pentaerythritol tetraglycidyl ether. Liquid polyepoxides are widely available from commercial sources. Exemplary liquid polyepoxides include: diglycidyl ethers of bisphenol A such as, for example, Epon Resin 825, Epon Resin 826, Epon Resin 827, Epon Resin 828, Epon Resin 830, Epon Resin 834, Epon Resin 862, and Epon Resin 863 from Momentive Specialty Chemicals, Columbus, Ohio, and as D.E.R. 330, D.E.R. 330-EL, D.E.R. 331-EL, D.E.R. 331LS, and D.E.R. 332 from Olin Corporation, Clayton, Missouri; diglycidyl ethers of bisphenol F such as, for example, D.E.R. 354 from Olin Corp.; and combinations of the foregoing.

The polyepoxide comprising an addition reaction product of phenolphthalein and bisphenol A diglycidyl ether can be made according to the procedures contained herein in Preparatory Example 1 described in the Examples section. In one embodiment, the addition reaction product comprises a compound having the structural formula

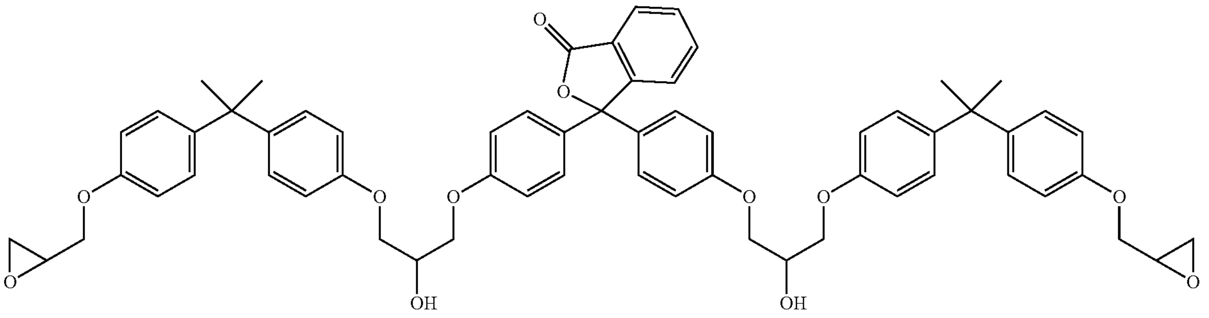 [SMILES: CC(C)(c1ccc(OCC(O)COc2ccc(C3(c4ccc(OCC(O)COc5ccc(C(C)(C)c6ccc(OCC7CO7)cc6)cc5)cc4)OC(=O)c4ccccc43)cc2)cc1)c1ccc(OCC2CO2)cc1]

In brief, the reaction product of phenolphthalein and bisphenol A diglycidyl ether can be accomplished by combining phenolphthalein and bisphenol A diglycidyl ether under conditions (e.g., at a temperature in the range of 165-180° C. for 3 hours in the presence of ethyltriphenylphosphonium acetate catalyst) wherein the phenolphthalein OH groups on one phenolphthalein molecule condense with one glycidyl group on each of two bisphenol A diglycidyl ether molecules.

Accordingly, the stoichiometric ratio of bisphenol A diglycidyl ether to phenolphthalein should typically be at least 2, preferably at least 2.3, or even at least 2.5 moles of bisphenol A diglycidyl ether per mole of phenolphthalein, although some of the desired compound will be made even using a ratio of less than 2.

Any curative capable of curing glycidyl-ether-based epoxy resins may be included as a curative, for example. By the term curative is meant one or more reactive components capable of either reacting with an epoxy functional group and/or polymerizing the epoxy functional group. Preferably, the curative comprises a latent curative that is activated by heating (e.g., to at least 40° C., at least 50° C., or even at least 60° C.) and/or by exposure to actinic radiation (e.g., visible and/or ultraviolet light).

Examples of suitable curatives include guanidines, substituted guanidines, substituted ureas, melamine resins, guanamine derivatives, blocked polyamines, aromatic polyamines, and/or mixtures thereof. The curative may be involved stoichiometrically in the curing reaction; it may, however, also be catalytically active. Examples of suitable substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and cyanoguanidine (dicyandiamide). Examples of suitable guanamine derivatives which may be mentioned are alkylated benzoguanamine resins, benzoguanamine resins or methoxymethylethoxymethylbenzoguanamine.

Exemplary curatives also include substituted imidazoles (e.g., 1-N-substituted imidazoles and 2-C-substituted imidazoles, and metal imidazolate salts as described in U.S. Pat. No. 4,948,449 (Tarbutton et al.)), substituted ureas, substituted hydrazides (e.g., aminodihydrazide, adipic dihydrazide, isophthalyl dihydrazide), substituted guanidines (e.g., tetramethyl guanidine), primary and/or secondary polyamines, diaminodiaryl sulfones (diaminodiphenyl sulfone) and combinations thereof.

Additional examples of suitable curatives include monomeric and oligomeric amine-functional polyarylenes, wherein between the arylene groups are simple covalent bridges such as in the diaminodiphenyls, or connecting groups selected from the group consisting of alkylene of from 1-8 carbon atoms, ether, sulfone, ketone, carbonate, carbonyl, carboxylate, carboxamide, and combinations thereof. Examples include 3,3'-diaminodiphenylsulfone and 4,4'-diaminodiphenylsulfone.

Commercially available curatives include, for example, ANCAMINE CG-1400 micronized dicyandiamide from Air Products and Chemicals Incorporated, Allentown, Pennsylvania; those available CUREZOL 2PHZ-S and CUREZOL 2MA-OK also from Air Products and Chemicals; ARADUR 3123 from Huntsman Advanced Materials, The Woodlands, Texas; and as OMICURE U-35 and OMICURE U-52 from CVC Thermoset Specialties, Moorestown, New Jersey.

Optionally, at least one thermoplastic polymer may be included in curable compositions according to the present disclosure, typically in an amount of 0.01 to 10 percent by weight, preferable 0.5 to 7 percent by weight based on the total weight of the curable composition, although other amounts may also be used. Examples of suitable thermoplastics include polyoxazolines, polyamides, polysulfones, polycarbonates, polyesters, polyurethanes, polyether ketone (PEK), polyacrylates, polyaryl ethers, poly(phenylene oxide) (PPO), polyphenylene sulfide (PPS), and combinations thereof. The thermoplastic polymer may help reduce sag, and its presence also helps reduce the shrinkage and improve toughness of the cured composition.

The curable composition may contain filler (e.g., fibers and/or particles), typically in an amount of from 0.01 to 60 percent by weight, preferably 1 to 50 percent by weight, and more preferably 5 to 40 percent by weight, although other amounts may also be used. Exemplary fillers include quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite. In some embodiments, the filler comprises an inorganic filler having a density of at least 2 grams per cubic centimeter. Exemplary such fillers include most metal particles (e.g., aluminum powder).

In some embodiments, the curable composition includes 1 to 35 percent by weight based on the total weight of the curable composition of core-shell particle tougheners. Each core-shell particle comprises an elastomeric core and a polymeric outer shell layer disposed on the elastomeric core. Examples include core-shell impact modifiers available as PARALOID EXL from Dow Chemical, Midland, Michigan in grades such as, for example, EXL-2691, EXL-3300, EXL-2300/3300, EXL-2330, EXL-2650J, and combinations thereof. Core-shell particles pre-dispersed into the liquid epoxy or solid epoxy may also be used and exemplary types are available from Kaneka Texas Corporation of Pasadena, Texas as MX type resins.

The curable composition may be converted into a curable adhesive film using any suitable technique such as, for example, calendering, pressing, molding, hot melt coating and solvent casting. The curable adhesive film may be in the form of a tape, sheet, or gasket, for example. Optionally, a scrim may be included in curable adhesive films according to the present disclosure.

In some embodiments, the curable adhesive film is tacky, in some of those cases the curable adhesive film is a pressure-sensitive adhesive, optionally paired with a suitable release liner.

Curable compositions and curable adhesive films according to the present disclosure are useful, for example for bonding to at least one substrate, preferably for bonding two substrates together. Examples of suitable substrates include, metals, plastics, glass, ceramic, brick, composite materials (e.g., graphite fiber composites).

Select Embodiments of the Present Disclosure

In a first embodiment, the present disclosure provides a curable composition comprising, based on the total weight of the curable composition, components:

a) 1 to 65 percent by weight of polyepoxide comprising an addition reaction product of phenolphthalein and bisphenol A diglycidyl ether; and b) 5 to 50 percent by weight of liquid polyepoxide, wherein the liquid polyepoxide is exclusive of component a); and c) an effective amount of curative for curing the curable composition.

In a second embodiment, the present disclosure provides a curable composition according to the first embodiment, wherein the components further comprise, based on the total weight of the curable composition:

d) 0.01 to 10 percent by weight of thermoplastic polymer.

In a third embodiment, the present disclosure provides a curable composition according to the first or second embodiment, wherein the components further comprise, based on the total weight of the curable composition:

e) 0.01 to 50 percent by weight of filler particles.

In a fourth embodiment, the present disclosure provides a curable composition according to any one of the first to third embodiments, wherein based on the total weight of the curable composition, the addition reaction product of phenolphthalein and bisphenol A diglycidyl ether is present in an amount of from 10 to 40 percent by weight.

In a fifth embodiment, the present disclosure provides a curable composition according to any one of the first to fourth embodiments, wherein said curative comprises dicyandiamide.

In a sixth embodiment, the present disclosure provides a curable composition according to any one of the first to fifth embodiments, wherein based on the total weight of the curable composition, said curative is present in an amount of from 0.01 to 40 percent by weight.

In a seventh embodiment, the present disclosure provides a curable composition according to any one of the first to sixth embodiments, wherein the components further comprise:

f) core-shell particles, wherein each core-shell particle comprises an elastomeric core and a polymeric outer shell layer disposed on the elastomeric core.

In an eighth embodiment, the present disclosure provides a curable composition according to the seventh embodiment, wherein based on the total weight of the curable composition, the core-shell particles are present in an amount of from 1 to 35 percent by weight.

In a ninth embodiment, the present disclosure provides a curable composition according to any one of the first to eighth embodiments, wherein the components further comprise:

g) an inorganic filler having a density of at least 2 grams per cubic centimeter.

In a tenth embodiment, the present disclosure provides a curable composition according to the ninth embodiment, wherein the inorganic filler comprises aluminum powder.

In an eleventh embodiment, the present disclosure provides a curable composition according to the ninth or tenth embodiment, wherein based on the total weight of the curable composition, the inorganic filler is present in an amount of from 5 to 40 percent by weight.

In a twelfth embodiment, the present disclosure provides a curable adhesive film comprising a curable composition according to any one of first to eleventh embodiments. Preferably, the curable adhesive film is self-supporting.

In a thirteenth embodiment, the present disclosure provides a curable adhesive film according to the twelfth embodiment, wherein the curable adhesive film is tacky.

In a fourteenth embodiment, the present disclosure provides a curable adhesive film according to the twelfth or thirteenth embodiment, wherein the curable adhesive film is a pressure-sensitive adhesive.

In a fifteenth embodiment, the present disclosure provides a method of bonding a curable adhesive film to a substrate, the method comprising:

intimately contacting a curable adhesive film of any one of the twelfth to fourteenth embodiments with the substrate; and at least partially curing the curable adhesive film.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below, lists designations and materials used in the examples.

TABLE 1

| DESIGNATION | DESCRIPTION | SOURCE |
|---|---|---|
| MX-416 | Multifunctional tetraglycidyl methylenedianiline (TGMDA) with 25% core shell rubber toughening agent having an approximate epoxy equivalent weight of 148 grams/equivalent, available as KANE ACE MX 416 | Kaneka Texas Corporation, Pasadena, TX |
| MX-257 | A diglycidyl ether of bisphenol-A epoxy resin containing 37.5 wt. % butadiene-acrylic co-polymer core shell rubber having an approximate epoxy equivalent weight of 294 grams/equivalent, available as KANE ACE MX 257 | Kaneka Texas Corporation |
| MY-9655 | Multifunctional tetraglycidyl methylenedianiline (TGMDA), available as ARALDITE MY-9655 | Huntsman Advanced Chemicals, Woodlands, TX |
| EPON 828 | A bisphenol-A liquid epoxy resin having an epoxy equivalent weight of 185-192 grams/equivalent, available as EPON 828 | Hexion Specialty Chemicals, Louisville, KY |
| EPON 1004 | A bisphenol-A solid epoxy resin having an epoxy equivalent weight of 800-950 grams/equivalent | Hexion Specialty Chemicals |
| SU 8 | A solid epoxy having an average functionality of about 8, available as EPON RESIN SU-8 | Hexion Specialty Chemicals |
| PKHP 200 | Phenoxy resin | Gabriel Phenoxies, Inc., Akron, OH |
| EXL-2691 | A general-purpose methacrylate-butadiene-styrene (MBS) core-shell impact modifier available as PARALOID EXL-2691 | Dow Chemical Company, Midland, MI |
| MY-721 | A tetrafunctional epoxy resin, available as ARALDITE MY-721 | Huntsman Advanced Chemicals |
| TACTIX 742 | A dicyclopentadienyl-based epoxy resin, available as TACTIX 742 RESIN | Huntsman Advanced Chemicals, Woodlands, TX |
| ATPES | Amine terminated polyether sulfone, available as VW-30500 RP | Solvay, Brussels, Belgium |
| DICY | A micronized dicyandiamide having an approximate amine equivalent weight of 21 grams/equivalent, available as ANCAMINE CG-1400 | Air Products and Chemicals Incorporated, Allentown, PA |
| DDS | Aromatic amine 4,4'-diaminodiphenyl sulfone (DDS), available as HT 9664 | Huntsman Advanced Chemicals, |
| Al 105 | Spherical Aluminum Powders having D50 5 micro particle size | Toyal America, Naperville, IL |
| R816 | Surface modified fumed silica, available as AEROSIL R 816 | Evonik Industries AG, Essen, Germany |
| Phenolphthalein | 3,3-Bis(4-hydroxyphenyl)-1(3H)-isobenzofuranone | Millipore Sigma, St. Louis, MO |
| ETPPAC | Ethyltriphenylphosphonium acetate | Dow Chemical Company |

Test Methods:

Grade 2024T3 bare aluminum panels were obtained from Erickson Metals of Minnesota, Inc., Coon Rapids, Minnesota. Prior to bonding with structural adhesive, the panels were subjected to the following surface preparation process.

A bare aluminum panel was soaked in OAKITE 165 caustic wash solution for 10 minutes at 85° C. The panel was then immersed in tap water for 10 minutes at 21° C., followed by a continuous spray rinsing with tap water for approximately 3 more minutes. The panel was then immersed in a Forest Products Laboratory (FPL) etch solution for 10 minutes at 66° C., after which the panel was spray rinsed with water for approximately 3 minutes at 21° C., allowed to drip dry for another 10 minutes, then dried in an oven for 30 minutes at 54° C. The etched panel was then anodized in a bath of 85% percent phosphoric acid at 22.2° C. for approximately 25 minutes at a voltage of 15 volts and a maximum current of 100 amps, rinsed with water for approximately 3 minutes at 21° C., allowed to drip dry for another 10 minutes, then dried in an oven for 10 minutes at 66° C. Within 24 hours of being anodized, the aluminum panel was primed with a corrosion inhibiting primer, available as SCOTCH-WELD STRUCTURAL ADHESIVE PRIMER, EC-3917 from 3M Company, according to the manufacturer's instructions. The dried primer thickness was between 0.1-0.2 mils (2.5-5.1 micrometers).

Overlap Shear Testing (OST) for Adhesive Film

Primed panels of 2024-T3 bare aluminum measuring 10.16 cm×17.78 cm×0.16 cm (4 inches long×7.0 inches×0.063 inches) were prepared for testing as described above. The primed panels were bonded to one another in an overlapping relationship along their lengthwise dimension. After removing the liner from one side, the example adhesive film was applied by hand using a small rubber roller in such a manner as to exclude entrapped air and insure intimate contact between the exposed adhesive and the test panel substrate. After removing the second liner, the resulting assembly was fastened together using tape and cured in an autoclave (refer to Adhesive Cure Cycle method defined below). The bonded panels were sawn across their width into 2.54 cm (1 inch) wide strips and evaluated for overlap shear strength in accordance with ASTM D1002-05 "Standard Test Method for Apparent Shear Strength of Single-Lap-Joint Adhesively Bonded Metal Specimens by Tension Loading (Metal-to-Metal)" using a grip separation rate of 0.05 inch/minute (1.3 mm/min) using a tensile tester. Seven test panels were prepared and evaluated (one for each example).

Floating Roller Peel (FRP) Strength Test for Adhesive Film

Primed panels of 2024-T3 bare aluminum measuring 20.3 cm×7.6 cm×0.16 cm (8.0 inches×3.0 inches×0.063 inch), and 25.4 cm×7.6 cm×0.064 cm (10 inches×3 inches×0.025 inch), were prepared for testing as described above. After removing the liner from one side, the example adhesive film was applied by hand using a small rubber roller in such a manner as to exclude entrapped air and insure intimate contact between the exposed adhesive and the test panel substrate. The primed panels were bonded together and cured in an autoclave (refer to Adhesive Cure Cycle method defined below), then evaluated for floating roller peel strength in accordance with ASTM D3167-76 "Standard Test Method for Floating Roller Peel Resistance of Adhesives" with the following modification. Test strips measuring 1.27 cm (0.5 inches) wide were cut along the lengthwise direction of the bonded aluminum panels. A tensile testing machine operated at a rate of 30.5 cm/minute (6 inches/minute) was used to peel the thinner substrate from the thicker one and the results normalized to a width of 2.54 cm (1 inch). Seven test panels were prepared and evaluated (one for each example).

Adhesive Cure Cycle

The bonded sample using the film adhesive made in the invention was vacuum bagged to a pressure of approximately 28 inches mercury (94.8 kPa) in an autoclave, model number ECONOCLAVE 3×5, from ASC Process Systems, Sylmar, California. Autoclave pressure was increased to 45 psi (310.3 kPa), during which the vacuum bag was vented to the atmosphere once the autoclave pressure surpassed 15 psi (103.4 kPa). Autoclave temperature was then increased at a rate of 4.5° F. (2.5° C.) per minute to 350 F (177° C.). After reaching the set point the sample was held for 60-90 minutes at this temperature, then cooled at a rate of 5° F. (2.8° C.) per minute to 72° F. (22.2° C.) before releasing the pressure.

Preparatory Example 1

Phenolphthalein (127.5 grams (g)) was added into a three-necked flask already containing 300 g of EPON 828 in it at 100° C. Then 1.0 gram of ETPPAC catalyst was added. The mixture was heated to 130-140° C. with agitation and the exothermic process was monitored controlling the temperature so that it did not reach higher than 180° C. After the exothermic process subsided, the reaction continued at 165-180° C. for another two to three hours with agitation. The reaction mixture was cooled to 130-150° C., and then discharged. The product was designated PI Epoxy and was used in the adhesive formulations.

Examples 1-6 and Comparative Example A

These Examples were prepared according to the following consecutive steps.

Step 1—Pre-reaction of ATPES and Epoxy Resins:

EPON 828, MY-9655, PI Epoxy, TACTIX 742, SU 8 and other epoxy were combined in the amounts indicated in Table 2, and melted together at 149° C. (300° F.). After the mixture was melted, the ATPES was added and agitation continued at 149° C. (300° F.) until the ATPES dissolved. The mixture was held for one to three hours to allow the amine group to react with the epoxy groups.

Step 2—Pre-Mixing of PKHP-200 and Epoxy Resins:

EPON 828, MY-9655, PI Epoxy, TACTIX 742, SU 8 and other epoxy were combined in the amounts indicated in Table 2, and melted together at 149° C. (300° F.). After the mixture was melted, the PKHP 200 was added and agitation continued at 149° C. (300° F.) until the PKHP 200 dissolved.

Step 3:

After Step 1 or Step 2 reached the desired level, then the other remaining epoxy component (e.g., MX-257) was added and thoroughly mixed in quantities as indicated in Table 2. The fumed silica (R816) was added in quantities as indicated in Table 2 and dispersed using a high-speed mixer. After mixing well, the Aluminum powder was added in quantities as indicated in Table 2 along with the and curatives (in quantities identified in Table 2) and mixed using a high-speed mixer (mixing time limited to no more than three minutes and care was taken to ensure that the mixture was not over-heated during mixing).

Step 4:

The mixtures from Step 3 were immediately used to draw a film on a silicone-coated liner. A film adhesive was achieved for each of the Examples listed in Table 2, below.

TABLE 2

| EXAMPLE | MX-416 | MX-257 | MY-9655 | EPON 828 | SU 8 | PI Epoxy | EPON 1004 | TACTIX 742 | PKHP 200 | EXL-2691 |
|---|---|---|---|---|---|---|---|---|---|---|
| 1 | 18.1 | 30.0 | 10.9 | 0.0 | 0.0 | 15.9 | 0.0 | 0.0 | 3.0 | 0.0 |
| 2 | 18.1 | 30.0 | 0.0 | 0.0 | 0.0 | 10.3 | 0.0 | 0.0 | 0.0 | 0.0 |
| 3 | 18.1 | 30.0 | 0.0 | 0.0 | 0.0 | 15.9 | 0.0 | 0.0 | 0.0 | 0.0 |
| 4 | 18.1 | 30.0 | 0.0 | 0.0 | 0.0 | 15.9 | 0.0 | 0.0 | 3.0 | 0.0 |
| 5 | 0.0 | 0.0 | 16.0 | 28.9 | 7.0 | 10.0 | 0.0 | 0.0 | 0.0 | 12.0 |
| 6 | 12.0 | 25.0 | 0.0 | 8.0 | 8.0 | 22.0 | 0.0 | 15.0 | 0.0 | 0.0 |
| COMPARATIVE EXAMPLE A | 0.0 | 30.0 | 12.0 | 0.0 | 8.0 | 0.0 | 15.0 | 15.0 | 5.0 | 0.0 |

| EXAMPLE | MY-721 | ATPES | DICY | DDS | DICY/IPDH | Aluminum | R816 |
|---|---|---|---|---|---|---|---|
| 1 | 0.0 | 0.0 | 0.0 | 26.1 | 0.0 | 0.0 | 0.0 |
| 2 | 10.9 | 3.6 | 0.0 | 23.0 | 2.0 | 0.0 | 1.5 |

TABLE 2-continued

| | | | | | | | |
|---|---|---|---|---|---|---|---|
| 3 | 10.9 | 3.6 | 0.0 | 27.5 | 0.0 | 0.0 | 2.0 |
| 4 | 0.0 | 0.0 | 0.0 | 26.5 | 0.0 | 30.0 | 2.0 |
| 5 | 0.0 | 6.0 | 0.5 | 25.5 | 0.0 | 30.0 | 2.0 |
| 6 | 0.0 | 0.0 | 1.0 | 30.0 | 0.0 | 0.0 | 0.0 |
| COMPARATIVE EXAMPLE A | 0.0 | 0.0 | 1.0 | 30.0 | 0.0 | 0.0 | 0.0 |

Overlap Shear and Floating Roller Peel test results for Examples 1 to 6 and Comparative Example A are represented in Table 3, below.

TABLE 3

| EXAMPLE | OVERLAP SHEAR 23° C. MPa (psi) | OVERLAP SHEAR 350° C. MPa (psi) | FLOATING ROLLER PEEL 23° C. N/25 mm (Piw) |
|---|---|---|---|
| 1 | 37.97 (5507) | 19.29 (2798) | 115.20 (25.9) |
| 2 | 32.66 (4737) | 17.06 (2474) | 57.82 (13.0) |
| 3 | 34.18 (4958) | 13.39 (1942) | 72.95 (16.4) |
| 4 | 36.26 (5259) | 16.29 (2363) | 98.75 (22.2) |
| 5 | 35.63 (5167) | 19.01 (2757) | 83.18 (18.7) |
| 6 | 29.85 (4330) | 15.35 (2226) | 69.39 (15.6) |
| COMPARATIVE EXAMPLE A | 26.81 (3889) | 10.59 (1536) | 45.37 (10.2) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising, based on the total weight of the curable composition, components:

a) 1 to 65 percent by weight of polyepoxide comprising an addition reaction product of phenolphthalein and bisphenol A diglycidyl ether, wherein the addition reaction product of phenolphthalein and bisphenol A diglycidyl ether comprises a compound having the structural formula;

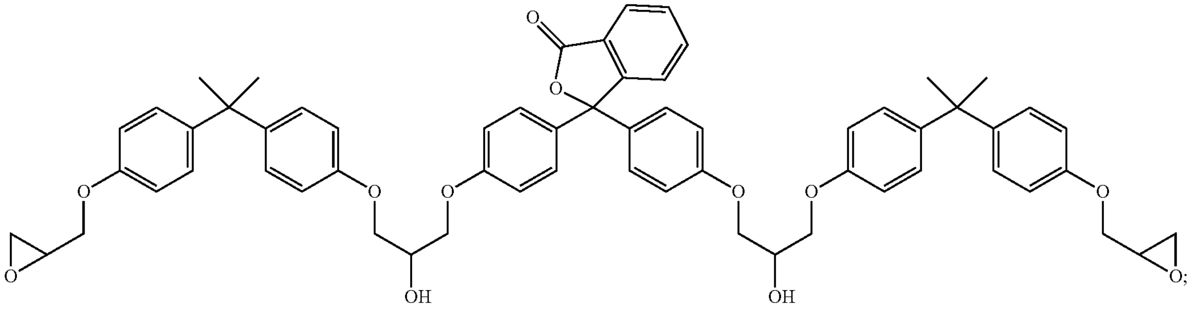 [SMILES: CC(C)(c1ccc(OCC(O)COc2ccc(C3(c4ccc(OCC(O)COc5ccc(C(C)(C)c6ccc(OCC7CO7)cc6)cc5)cc4)OC(=O)c4ccccc43)cc2)cc1)c1ccc(OCC2CO2)cc1]

and b) 5 to 50 percent by weight of liquid polyepoxide, wherein the liquid polyepoxide is exclusive of component a); and c) an effective amount of curative for curing the curable composition.

2. The curable composition of claim 1, wherein the components further comprise, based on the total weight of the curable composition:

d) 0.01 to 10 percent by weight of thermoplastic polymer.

3. The curable composition of claim 1 wherein the components further comprise, based on the total weight of the curable composition:

e) 0.01 to 50 percent by weight of filler particles.

4. The curable composition of claim 1, wherein based on the total weight of the curable composition, the addition reaction product of phenolphthalein and bisphenol A diglycidyl ether is present in an amount of from 10 to 40 percent by weight.

5. The curable composition of claim 1, wherein said curative comprises dicyandiamide.

6. The curable composition of claim 1, wherein based on the total weight of the curable composition, said curatives are present in an amount of from 0.01 to 40 percent by weight.

7. The curable composition of claim 1, wherein the components further comprise:

f) core-shell particles, wherein each core-shell particle comprises an elastomeric core and a polymeric outer shell layer disposed on the elastomeric core.

8. The curable composition of claim 7, wherein based on the total weight of the curable composition, the core-shell particles are present in an amount of from 1 to 35 percent by weight.

9. The curable composition of claim 1, wherein the components further comprise:

g) an inorganic filler having a density of at least 2 grams per cubic centimeter.

10. The curable composition of claim 9, wherein the inorganic filler comprises aluminum powder.

11. The curable composition of claim 10, wherein based on the total weight of the curable composition, the inorganic filler is present in an amount of from 5 to 40 percent by weight.

12. A curable adhesive film comprising the curable composition of claim 1.

13. The curable adhesive film of claim 12, wherein the curable adhesive film is tacky.

14. The curable adhesive film of claim 12, wherein the curable adhesive film is a pressure-sensitive adhesive.

15. A method of bonding a curable adhesive film to a substrate, the method comprising:

intimately contacting the curable adhesive film of claim 12 with the substrate; and at least partially curing the curable adhesive film.

* * * * *